United States Patent Office 3,357,815
Patented Dec. 12, 1967

3,357,815
DESTROYING UNDESIRED VEGETATION WITH ALKENYL 1 - POLYMETHYLENIMINECARBO-THIOLATES
John J. D'Amico, Dunbar, W. Va., assignor to Monsanto Company, St. Louis, Mo., a corporation of Delaware
No Drawing. Continuation of application Ser. No. 530,780, Mar. 1, 1966, which is a division of application Ser. No. 473,225, July 19, 1965. This application Jan. 31, 1967, Ser. No. 612,776
19 Claims. (Cl. 71—83)

ABSTRACT OF THE DISCLOSURE

Destroying undesired vegetation by applying to the soil a compound of the formula

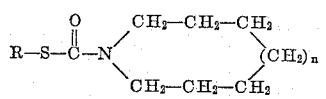

where $n$ is 0, 1, or 2, and R is alkenyl or monohalogenated alkenyl.

This application is a continuation of application Serial No. 530,780, filed Mar. 1, 1966, now abandoned, which was a division of application Ser. No. 473,225, filed July 19, 1965, now abandoned, which latter application was a continuation-in-part of application Ser. No. 195,332, filed May 16, 1962, now abandoned, and of application Ser. No. 111,171, filed May 19, 1961, now abandoned.

This invention relates to a class of alkenyl thiolcarbamates and to herbicidal compositions and methods of destroying undesired vegetation employing the compounds.

In recent years there has been an increasing demand, particularly in the midwest, for herbicides which will control herbs and plants of the buckwheat (Polygonaceae) family. Many pernicious weeds of economic significance belong to this family which are resistant to herbicides heretofore known. However, there has now been discovered a class of alkenyl thiolcarbamates which are exceedingly toxic to the buckwheat family, especially when incorporated in the top soil. In addition, the compounds are valuable pre-emergent herbicides for control of weeds belonging to other plant families. They are effective on a wide variety of grasses and on other broadleaf plants as hereinafter illustrated. They exert marked specificity to Johnson grass in the presence of many important crop plants. Some compounds of the new class destroy wild oat seedlings at low concentrations with little or no injury to crops.

The alkenyl thiolcarbamates of the present invention which are preferred may be represented by the formula

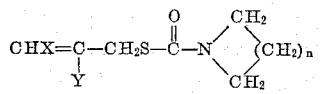

wherein X and Y are halogen, hydrogen, or methyl, but not more than one is halogen, and $n$ is an integer from 4 to 6. The halogen is preferably chlorine or bromine but may be fluorine or iodine. Buckwheat (*Fagopyrum esculentum*), wild buckwheat (*Polygonum convolvulus*), smartweed (*Polygonum pennsylvanicum*), and curled dock (*Rumex crispus*) are examples of Polygonaceae destroyed by these compounds. The new toxicants may be obtained by the general method of producing thiolcarbamates, of which the following will serve as examples:

Example 1

There was charged to a reactor 30 grams (0.3 mole) of hexamethylenimine, 50 ml. of water and 40 grams (0.25 mole) of 25% sodium hydroxide. To the stirred charge was bubbled in 19 grams (0.27 mole) of 85% COS over a period of 30 minutes. The reaction mixture was kept at 0°–6° C. during the addition. There was then added in one portion at 0° C. 27.8 grams (0.25 mole) of 2,3-dichloro-1-propene. The temperature of the reaction mixture was maintained at 0°–5° C. the first hour, 5°–10° C. the second hour, 10°–15° C. the third hour, 20°–25° C. the fourth hour, and 25°–30° C. the fifth hour. Then 200 ml. of water and 350 ml. of ethyl ether were added. After stirring for 15 minutes the ether layer which separated was washed with water until the washings were neutral to litmus and dried over sodium sulfate. The ether was removed in vacuo at a maximum temperature of 80°–90° C./1–2 mm. 2-chloroallyl hexahydro-1H-azepine-1-carbothiolate was obtained in 78.8% yield as an amber liquid insoluble in water but soluble in common organic solvents. Upon distillation an analytical sample, B.P. 152°–154° C. at 1 mm., was obtained. Analysis gave 5.74% nitrogen, 13.80% sulfur, and 15.88% chlorine compared to 5.99% nitrogen, 13.72% sulfur, and 15.17% chlorine calculated for $C_{10}H_{16}ClNOS$. Replacing 2,3-dichloro-1-propene by 0.25 mole of allyl chloride in the foregoing process gave allyl hexahydro-1H-azepine-1-carbothiolate in 86.5% yield. The product was an amber oil, B.P. 123°–125° C. at 1 mm. containing 7.09% nitrogen and 16.10% sulfur as compared to 7.03% nitrogen and 16.09% sulfur calculated for $C_{10}H_{17}NOS$.

Example 2

In the procedure of Example 1, the 85% COS was bubbled in over a period of 30 minutes at a temperature of 0°–7° C. 2-bromo-3-chloro-1-propene was substituted for 2,3-dichloro-1-propene and after stirring the reaction mixture at 0° to 30° C. over a period of 5 hours as in Example 1, stirring was continued at 25°–30° C. for an additional 19 hours. The stirred reaction mixture was extracted with 400 ml. of ethyl ether and isolated as described. 2-bromoallyl hexahydro-1H-azepine-1-carbothiolate was obtained in 86.4% yield as an amber liquid insoluble in water but soluble in common organic solvents. Analysis gave 4.84% nitrogen compared to 5.03% calculated for $C_{10}H_{16}BrNOS$.

Example 3

To a stirred solution of 35 grams (0.35 mole) of hexamethylenimine, 50 ml. of water and 40 grams (0.25 mole) of 25% sodium hydroxide was bubbled in 19.5 grams (0.28 mole) of 85% COS. The temperature was held at 0°–10° C. during the addition which required 30 minutes. There was then added at 0° C. in one portion 27.8 grams of 1,3-dichloro-1-propene and the mixture stirred at 0° C. to 30° C. over a period of 5 hours as in Example 1. Then 200 ml. of water and 300 ml. of ethyl ether were added and stirring continued for 15 minutes. The ether layer was washed with water until neutral to litmus and dried over sodium sulfate. The ether was removed in vacuo at a maximum temperature of 80°–90° C./1–2 mm. 3-chloroallyl hexahydro-1H-azepine-1-carbothiolate was obtained in 96% yield as a dark amber oil insoluble in water but soluble in common organic solvents. Analysis gave 6.03% nitrogen, 14.07% sulfur, and 15.70% chlorine compared to 5.99% nitrogen, 13.72% sulfur, and 15.17% chlorine calculated for $C_{10}H_{16}ClNOS$.

Example 4

In the procedure of Example 3, the 85% COS was bubbled in over a period of 30 minutes at a temperature of 0°–10° C. Methallyl chloride was substituted for 1,3-dichloro-1-propene and after stirring the reaction mixture at 0° C. to 30° C. over a period of 5 hours as in Example 3, stirring was continued at 25°–30° C. for an additional 19 hours. Then 200 ml. of water and 500 ml. of ethyl ether were added and the product isolated as described. 2-methylallyl hexahydro-1H-azepine-1-carbothiolate was obtained in 81% yield as a dark amber oil, insoluble in water but soluble in common organic solvents. Analysis gave 6.58% nitrogen and 15.51% sulfur compared to 6.57% nitrogen and 15.03% sulfur calculated for $$C_{11}H_{19}NOS$$

Example 5

To a stirred solution of 17 grams (0.1 mole) of heptamethylenimine, 500 ml. of ethyl ether, and 20.8 grams (0.15 mole) of potassium carbonate was added dropwise, at 0°–10° C., 20.5 grams (0.15 mole) of allyl thiocarbonyl chloride. After stirring at 25°–30° C. for 24 hours, 500 ml. of water were added and stirring continued for 15 minutes. The ether layer was washed with water until the washings were neutral to litmus and dried over sodium sulfate. The ether was removed in vacuo at a maximum temperature of 80°–90° C./1–2 mm. Allyl hexahydro-1(2H)-azocinecarbothiolate was obtained in 78% yield as a colorless liquid insoluble in water but soluble in common organic solvents. Analysis gave 6.00% nitrogen and 16.05% sulfur compared to 6.57% nitrogen and 15.03% calculated for $C_{11}H_{19}NOS$.

Example 6

In the procedure of Example 5, 19.1 grams (0.15 mole) of octamethylenimine was substituted for heptamethylenimine. Allyl octahydro-1H-azonine-1-carbothiolate was obtained in 91.5% yield as a light amber liquid insoluble in water but soluble in common organic solvents. Analysis gave 5.63% nitrogen and 14.42% sulfur compared to 6.16% nitrogen and 14.10% sulfur calculated for $$C_{12}H_{21}NOS$$

Example 7

In the procedure of Example 1, octamethylenimine was substituted for hexamethylenimine, and the 85% COS was bubbled in over a period of 15 minutes at 0°–10° C. After stirring the reaction mixture at 0° to 30° C. over a period of 5 hours as in Example 1, stirring was continued at 25°–30° C. for an additional 19 hours. Then 200 ml. of water and 400 ml. of ethyl ether were added. After stirring for 15 minutes, the desired 2-chloroallyl octahydro-1H-azonine-1-carbothiolate was isolated as described. It was obtained in 99% yield as a dark amber liquid insoluble in water but soluble in common organic solvents. Analysis gave 5.16% nitrogen, 12.58% sulfur, and 13.15% chlorine compared to 5.35% nitrogen, 12.25% sulfur, and 13.54% chlorine calculated for $$C_{12}H_{20}ClNOS$$

Example 8

In this example heptamethylenimine was substituted for octamethylenimine of Example 7 and 2-chloroallyl hexahydro-1(2H)-azocinecarbothiolate isolated substantially as described. It was obtained in 97% yield as a dark amber liquid insoluble in water but solbule in common organic solvents. Analysis gave 5.76% nitrogen, 13.23% sulfur, and 14.56% chlorine compared to 5.65% nitrogen, 12.94% sulfur, and 14.31 chlorine calculated for $$C_{11}H_{18}ClNOS$$

The unique herbicidal efficiency of the present compounds appears to be directly related to the presence of the polymethylenimine ring. Optimum properties were observed with allyl and monobromo or monochloroallyl esters, but in general lower alkenyl and lower monohalogenated alkenyl esters of less than six carbon atoms are useful herbicides. For example, the 3-chloro-2-butenyl ester possessed significant herbicidal properties. As illustrative of the potency of the new toxicants toward buckwheat and dock, aluminum pans, perforated on the bottom, were filled with a standard soil preparation to a depth of ⅜″ from the pan top. A counted number of seeds were scattered on the soil surface. The toxicant was sprayed on and thoroughly mixed with the ⅜″ cover layer of soil (450–500 grams of soil). The seeds were covered with the treated soil and placed in a greenhouse bench and watered from below as needed.

The seeds normally germinated and emerged in three to five days, and observations on the germination inhibition were made on the 14th day after planting. The number of seeds emerging times an injury factor gave an indication of the effectiveness of the compound. The injury factor took into consideration any plants not expected to survive and evened irregularities of ratings on seeds which varied in percent germination. Thus, ratings were based on the number of plants which emerged and would survive as observed two weeks after planting. Herbicidal ratings were assigned by means of the following conversion scale:

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

The following pytotoxicity ratings were observed at one pound per acre with allyl- and 2-haloallyl hexahydro-1H-azepine-1-carbothiolate. It will be noted that thiocarbamate herbicides containing two or more halogen atoms in the allyl group or a smaller number of members in the heterocyclic ring were not toxic to these species under the same conditions:

TABLE I

| Active Ingredient | Phytotoxicity Rating | |
|---|---|---|
|  | Buckwheat | Dock |
| Allyl hexahydro-1H-azepine-1-carbothiolate | 3 | ---- |
| 2-chloroallyl hexahydro-1H-azepine-1-carbothiolate | 3 | 3 |
| 2-bromoallyl hexahydro-1H-azepine-1-carbothiolate | 3 | 3 |
| Cis- and trans-2,3-dichloroallyl hexahydro-1H-azepine-1-carbothiolate | 0 | 1 |
| 2,3,3-trichloroallyl hexahydro-1H-azepine-1-carbothiolate | 0 | 0 |
| 2-chloroallyl 1-piperidinecarbothiolate | 0 | 0 |

Even at 0.3 pound per acre 2-chloroallyl hexahydro-1H-azepine-1-carbothiolate gave a rating of 2 on buckwheat and dock.

As illustrative of pre-emergence herbical activity against a wider spectrum of plants, pans were prepared to seed planting stage as before. Seeds of various grasses and broadleaf plants were scattered on the soil surface and then covered with soil to the pan top. The planted pans were placed in an exhaust hood and sprayed with a relatively high volume of volatile organic solvent containing the toxicant. The spray volume was kept constant and the test chemical applied at the rate of 5 pounds per acre. The prepared pans were next placed in the greenhouse bench as indicated above. Phytotoxicity ratings observed two weeks after planting are recorded in Table II.

TABLE II

| ACTIVE INGREDIENT | |
|---|---|
| 2-chloroallyl hexahydro-1H-azepine-1-carbothiolate. | Severe phytotoxicity to morning glory, wild oat, brome grass, rye grass, sugar beet, foxtail, crab grass, pigweed, wild buckwheat, and sorghum; moderate phytotoxicity to radish. |
| 3-chloroallyl hexahydro-1H-azepine-1-carbothiolate. | Severe phytotoxicity to wild oat, rye grass, foxtail, crab grass, pigweed, and sorghum; moderate phytotoxicity to rome grass, wild buckwheat, and tomato. |
| 2-bromoallyl hexahydro-1H-azepine-1-carbothiolate. | Severe phytotoxicity to morning glory, brome grass, rye grass, foxtail, crab grass, pigweed, soybean, wild buckwheat, and sorghum; moderate phytotoxicity to wild oat and radish. |
| Allyl hexahydro-1H-azepine-1-carbothiolate. | Severe phytotoxicity to wild oat, brome grass, rye grass, foxtail, crab grass, and wild buckwheat; moderate phytotoxicity to morning glory. |
| Allyl hexahydro-1(2H)-azocinecarbothiolate. | Severe phytotoxicity to morning glory, wild oat, brome grass, rye grass, foxtail, crab grass, pigweed, and sorghum; moderate phytotoxicity to tomato. |
| Allyl octahydro-1H-azonine-1-carbothiolate. | Severe phytotoxicity to morning glory, wild oat, rye grass, foxtail, crab grass, pigweed, and sorghum; moderate phytotoxicity to brome grass, sugar beet, and wild buckwheat. |
| 2-chloroallyl hexahydro-1(2H)-azocinecarbothiolate. | Severe phytotoxicity to morning glory, wild oat, rye grass, sugar beet, foxtail, crab grass, pigweed, wild buckwheat, tomato, and sorghum; moderate phytotoxicity to brome grass and radish. |

Soil incorporated applications at the dosages shown were made to Johnson grass seedlings (*Sorghum halepense*) in the manner described. Rice and soybean were included as crop plants.

TABLE III

| Active Ingredient | Lbs./acre | Phytotoxicity Rating | | |
|---|---|---|---|---|
| | | Johnson grass | Rice | Soybean |
| Allyl hexahydro-1H-azepine-1-carbothiolate | 1 | 3 | 0 | 0 |
| 2-chloroallyl hexahydro-1H-azepine-1-carbothiolate | 1 | 3 | 0 | 0 |
| 2-bromoallyl hexahydro-1H-azepine-1-carbothiolate | 1 | 3 | 1 | 0 |
| 2-methylallyl hexahydro-1H-azepine-1-carbothiolate | 1 | 3 | 1 | 0 |
| 3-chloroallyl hexahydro-1H-azepine-1-carbothiolate | 1 | 3 | 0 | 0 |
| Allyl octahydro-1H-azonine-1-carbothiolate | ¼ | 3 | 0 | 0 |
| 2-chloroallyl octahydro-1H-azonine-1-carbothiolate | ¼ | 3 | 1 | 0 |
| Allyl hexahydro-1(2H)-azocinecarbothiolate | ¼ | 3 | 0 | 0 |
| 2-chloroallyl hexahydro-1(2H)-azocinecarbothiolate | ¼ | 3 | | |

One hundred percent control of Johnson grass was also observed with allyl hexahydro-1H-azepine-1-carbothiolate, 2-chloroallyl hexahydro-1H-azepine-1-carbothiolate, and 2-bromoallyl hexahydro-1H-azepine-1-carbothiolate at 0.5 pound per acre.

The table below records the rates at which complete kill was achieved and slight injury observed from field scale application of 2-chloroallyl hexahydro-1H-azepine-1-carbothiolate to various crops and weeds. The specificity on Johnson grass is very apparent.

TABLE IV

| | Rate of application, complete kill | (Lbs./acre) for slight injury |
|---|---|---|
| Crops: | | |
| Cantaloupe | 12 | 5.5 |
| Cotton | 10.5 | 3.1 |
| Flax | 7.8 | 2.6 |
| Soybean | 12 | 2.6 |
| Alfalfa | 12 | 2.7 |
| Radish | 12 | 8.5 |
| Sugar beet | 7.2 | 3.1 |
| Corn | 12 | 8.5 |
| Oats | 12 | 4.6 |
| Barley | 12 | 6.8 |
| Weeds: | | |
| Barnyard grass | 4.3 | 1.8 |
| Crab grass | 3.6 | 0.5 |
| Brome grass | 6.3 | 2.2 |
| Johnson grass | 1.0 | 0.4 |

As illustrative of toxicity to wild oats in wheat, soil incorporated applications at two pounds per acre were made to wild oat (*Avena fatua*) in the manner described.

TABLE V

| Active Ingredient | Phytotoxicity Rating | |
|---|---|---|
| | Wild oat | Wheat |
| Allyl hexahydro-1(2H)-azocinecarbothiolate | 3 | 1 |
| Allyl octahydro-1H-azonine-1-carbothiolate | 3 | 0 |
| 2-chloroallyl octahydro-1H-azonine-1-carbothiolate | 3 | 0 |
| 2-chloroallyl hexahydro-1H-azepine-1-carbothiolate | 3 | 0 |

One hundred percent control of wild oats was also observed at 0.25 pound per acre with 3-chloroallyl hexahydro-1H-azepine-1-carbothiolate with no injury to wheat.

Although the toxicants of the present invention are insoluble in water, they may be dispersed therein and applied as an aqueous spray. Petroleum fractions make satisfactory, economical herbicidal adjuvants and readily lend themselves to emulsification in water where that is desired. Whether applied in conjunction with a carrier or not, admixture with a small amount of an organic surface-active agent capable of lowering the surface tension of water is desirable for field application. Examples of surface-active agents variously known as dispersing agents, wetting agents, or emulsifying agents comprise soft or hard potassium soaps, morpholine or dimethylamine oleate, sulfonated fish, castor, and petroleum oils, sodium salt of lignin sulfonic acid, alkylated aromatic sodium sulfonates such as decylbenzene sodium sulfonate, dodecylbenzene sodium sulfonate, butyl or other amine salt of decyl or dodecyl benzene sulfonic acid, sodium lauryl sulfate, disodium monolauryl phosphate, ethylene oxide condensation products of alkyl phenols, as for example octyl phenol, ethylene oxide condensation products of tall oil, ethylene oxide condensation products of higher alcohols or higher mercaptans. Mixtures of two or more surface-active agents are also feasible. Generally, the surface-active agent will comprise only a small proportion of the composition, say 0.1–15% by weight of the toxicant. Solution of the toxicant in organic solvents containing small amounts of surface-active agent provide versatile herbicidal compositions useful for direct application to soil or for preparing aqueous sprays. A suitable formulation comprises 45.47 parts by weight heavy aromatic naphtha, 5.0 parts by weight emulsifier, and 49.53 parts by weight toxicant.

The formulation of dry compositions for application as dusts or for further dilution with liquid carriers is readily accomplished by mixing the toxicant with a finely divided carrier. The latter will usually be in major proportions. Suitable carriers comprise talc, clay, prophyllite, silica, fuller's earth, diatomaceous earth, and flours such as walnut shell, wheat, soybean, and cottonseed flours. Magnesium or calcium carbonate and calcium phosphate are suitable solid carriers. Adsorption on inert granules such as granular forms of fuller's earth provide effective forms more convenient to apply and use than dusts.

It is intended to cover all changes and modifications of the examples of the invention herein chosen for purposes of disclosure which do not constitute departures from the spirit and scope of the invention.

What is claimed is:

1. The method of destroying undesired vegetation which comprises applying to the soil medium a phytotoxic concentration of a compound of the formula

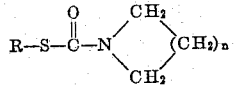

where R is a radical containing less than six carbon atoms selected from the group consisting of alkenyl and monohalogenated alkenyl and $n$ is an integer from 4 to 6, inclusive.

2. The method of destroying undesired vegetation which comprises applying to the soil medium a phytotoxic concentration of a compound of the formula

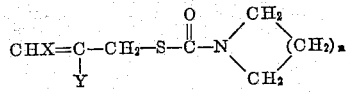

wherein X and Y are halogen, hydrogen, or methyl, not more than one being halogen, and $n$ is an integer from 4 to 6, inclusive.

3. The method of claim 1 where R is 2-chloroallyl and $n$ is 4.
4. The method of claim 1 where R is allyl and $n$ is 4.
5. The method of claim 1 where R is allyl and $n$ is 5.
6. The method of claim 1 where R is 2-chloroallyl and $n$ is 5.
7. The method of claim 1 where R is 2-chloroallyl and $n$ is 6.
8. The method of claim 1 where the soil contains germinating seeds and seedlings of Polygonaceae and R is allyl.
9. The method of claim 1 where the soil contains germinating seeds and seedlings of Polygonaceae and R is 2-chloroallyl.
10. The method of claim 1 where the soil contains seeds and seedlings of Johnson grass.
11. The method of claim 10 where R is 2-chloroallyl and $n$ is 4.
12. The method of claim 10 where R is allyl and $n$ is 4.
13. The method of claim 10 where R is allyl and $n$ is 5.
14. The method of claim 10 where R is 2-chloroallyl and $n$ is 5.
15. The method of claim 10 where R is allyl and $n$ is 6.
16. The method of claim 10 where R is 2-chloroallyl and $n$ is 6.
17. A herbicidal composition comprising a petroleum hydrocarbon solvent, a surface-active agent, and a compound of the formula

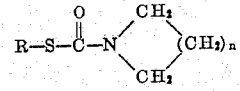

where R is a radical containing less than six carbon atoms selected from the group consisting of alkenyl and monohalogenated alkenyl and $n$ is an integer from 4 to 6, inclusive.

18. The composition of claim 17 where R is 2-chloroallyl and $n$ is 4.
19. The composition of claim 17 where R is allyl and $n$ is 4.

References Cited

UNITED STATES PATENTS 3,066,020  11/1962  Tilles et al. _____ 71—2.5
3,198,786  8/1965   Tilles et al. _____ 71—2.5 X

FOREIGN PATENTS 1,032,023  6/1958  Germany.

LEWIS GOTTS, *Primary Examiner.*

JAMES O. THOMAS, JR., *Examiner.*